US00RE37755E

(19) United States
(12) Reissued Patent
Cho et al.

(10) Patent Number: US RE37,755 E
(45) Date of Reissued Patent: *Jun. 18, 2002

(54) INTERPOLATION METHOD FOR BINARY IMAGE

(75) Inventors: Dae-sung Cho; Jae-seob Shin, both of Seoul (KR)

(73) Assignee: Samsung Electronics Co., Ltd. (KR)

( * ) Notice: This patent is subject to a terminal disclaimer.

(21) Appl. No.: 09/629,466

(22) Filed: Jul. 31, 2000

Related U.S. Patent Documents

Reissue of:
(64) Patent No.: 6,018,601
Issued: Jan. 25, 2000
Appl. No.: 09/087,270
Filed: May 29, 1998

U.S. Applications:

(63) Continuation of application No. 08/979,852, filed on Nov. 26, 1997, now Pat. No. 6,021,230.

(30) Foreign Application Priority Data

May 29, 1997 (KR) ..... 97-21781

(51) Int. Cl.[7] ..... G06K 9/32
(52) U.S. Cl. ..... 382/300; 382/270; 382/272; 382/299; 382/243

(58) Field of Search ..... 382/298–300, 382/270–272, 232–233, 243, 205

(56) References Cited

U.S. PATENT DOCUMENTS

| | | | | | |
|---|---|---|---|---|---|
| 4,771,471 | A | * | 9/1988 | Kiramura | 382/269 |
| 5,121,447 | A | * | 6/1992 | Tanioka et al. | 382/268 |
| 5,703,965 | A | * | 12/1997 | Fu et al. | 382/232 |
| 5,754,710 | A | * | 5/1998 | Sekine et al. | 382/300 |
| 5,818,964 | A | * | 10/1998 | Itoh | 382/205 |
| 5,875,268 | A | * | 2/1999 | Miyake | 382/276 |
| 5,911,007 | A | * | 6/1999 | Miyake | 382/233 |

FOREIGN PATENT DOCUMENTS

KR 96-30704 8/1996

* cited by examiner

*Primary Examiner*—Bhavesh Mehta
(74) *Attorney, Agent, or Firm*—Burns, Doane, Swecker & Mathis, L.L.P.

(57) ABSTRACT

An interpolation method in which a threshold value used for determining a pixel value of a pixel generated by interpolation according to a context (state value of adjacent pixels). In the interpolation method, the ambiguity between the interpolation value and the threshold value is removed by using the context (state value of the reference pixels around the interpolated pixel), thereby reducing the blocking and smoothing phenomena in the restored binary image.

10 Claims, 8 Drawing Sheets

INTERPOLATION METHOD FOR BINARY IMAGE

Matter enclosed in heavy brackets [ ] appears in the original patent but forms no part of this reissue specification; matter printed in italics indicates the additions made by reissue.

This is a continuation of U.S. patent application Ser. No. 08/979,852, filed Nov. 26, 1997, *now U.S. Pat. No. 6,021, 230,* and claims priority to Korean Patent Application No. 97-21781 filed in Korea on May 29, 1997, which are herein incorporated by reference.

BACKGROUND OF THE INVENTION

1. Field of the Invention

The present invention relates to an interpolation method for a binary image, and more particularly, to an improved interpolation method in which a variable threshold value used for determining a pixel value to be generated by interpolation is determined according to a context (the state value of adjacent pixels). This invention has been adopted in ISO/IEC JTC1/SC29/WG11 N1903 (ISO/IEC 14496-2 Subpart 7 Committee Draft.

2. Description of the Related Art

Recently, a function for processing shape information has been added to MPEG-4. The shape information, which refers to object information of the image, is expressed as a binary image. To code such a binary image, MPEG-4 adopts a content-based arithmetic encoder (CAE). For lossy shape coding a down sampling method and an upsampling method are performed in each shape macro block. A shape image is divided into shape blocks which have M×M block size.

The down sampling refers to a method for reducing the binary image block according to a given conversion ratio. The reduced image block is transmitted together with the conversion ratio. Here, the conversion ratio is determined such that an error between the original binary image block and an binary image block restored later is within a predetermined range.

The reduced image block obtained by the down sampling is coded by a context based arithmetic encoder (CAE) and then transmitted.

The up sampling method is used to restore such a reduced image block. Up sampling is for restoring the reduced image block into the original binary image, by interpolation.

In such an up sampling process, an effective interpolation method must not cause excessive blocking and smoothing effects in the restored binary image.

SUMMARY OF THE INVENTION

To satisfy the above requirement, it is an object of the present invention to provide an improved interpolation method in which a context (state value of pixels adjacent to a pixel (interpolated pixel) generated by interpolation) is used for interpolation, thereby reducing blocking and smoothing effects.

To achieve the above object, there is provided an interpolation method for a binary image, for restoring a reduced binary image, reduced from an original binary image by down sampling, into the original binary image, the method comprising the steps of: (a) calculating an interpolation value based on the pixel values (object pixel values) of the reduced image around an interpolated pixel; (b) calculating a context $C_P$(a state value of pixels (reference pixels) around the object pixels); (c) obtaining a threshold value corresponding to the calculated context; and (d) comparing the interpolation value with the threshold value of the step (c), and setting the pixel value of the interpolated pixel as "1" if the interpolation value is greater than the threshold value, and setting the pixel value of the interpolated pixel as "0" if the interpolation value is equal to or less than the threshold value.

The invention may be embodied in a general purpose digital computer that is running a program from a computer usable medium including but not limited to storage media such as magnetic storage media (e.g., ROM's, floppy disks, hard disks, etc.), optically readable media (e.g., CD-ROMs, DVDs, etc.), hybrid formats (magneto optical disks) and carrier waves (e.g., transmissions over the Internet). For instance, a part of the present invention can be computer usable medium having computer readable program code means embodied therein for processing by a machine for restoring a reduced binary image, reduced from an original binary image by down sampling, into the original binary image, the computer program being executable by the machine to perform the following steps:

(a) calculating an interpolation value based on the pixel values of pixels (object pixels) around an interpolated pixel;

(b) calculating a context $C_P$(a state value of pixels (reference pixels) around the object pixels);

(c) obtaining a threshold value corresponding to the calculated context; and (d) comparing the interpolation value with the threshold value of the step (c), and setting the pixel value of the interpolated pixel as "1" if the interpolation value is greater than the threshold value, and setting the pixel value of the interpolated pixel as "0" if the interpolation value is equal to or less than the threshold value.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1A:
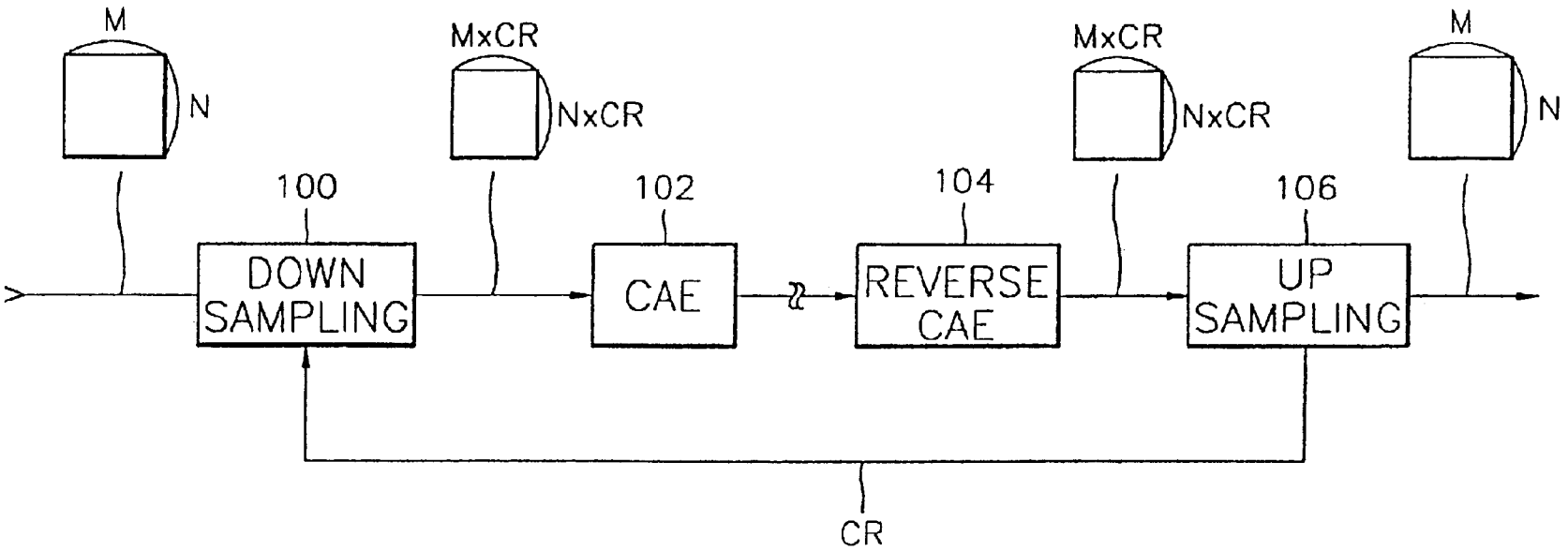
FIG. 1A is a diagram illustrating coding and decoding methods for a binary image according to MPEG-4.

In FIG. 1A, coding and decoding methods for a binary image having object information according to the MPEG-4 includes a down sampling step 100, a coding step 102, a reverse coding step 104 and an up sampling step 106.

In the down sampling step 100, an M×N binary image block is converted into an (M×CR)×(N×CR) binary image block. Here, CR is a conversion ratio indicating the ratio in size of the reduced image block obtained by the down sampling with respect to the original binary image block.

In the coding step 102, the reduced image is encoded. In order to code the binary image including objects, MPEG-4 adopts a context based arithmetic encoder (CAE). The CAE is an encoder which divides the binary image into blocks and processes all blocks by the same method. The CAE is adopted as a coding method in the verification model of MPEG-4, due to its simplicity and comparatively high coding efficiency.

The reduced image coded through the coding step 102 is transmitted via a transmission route. In the reverse coding step 104, the coded reduced image is restored into the reduced image. In the up sampling step 106, the interpolation is performed on the reduced image to obtain the original binary image.

Figure 1B:
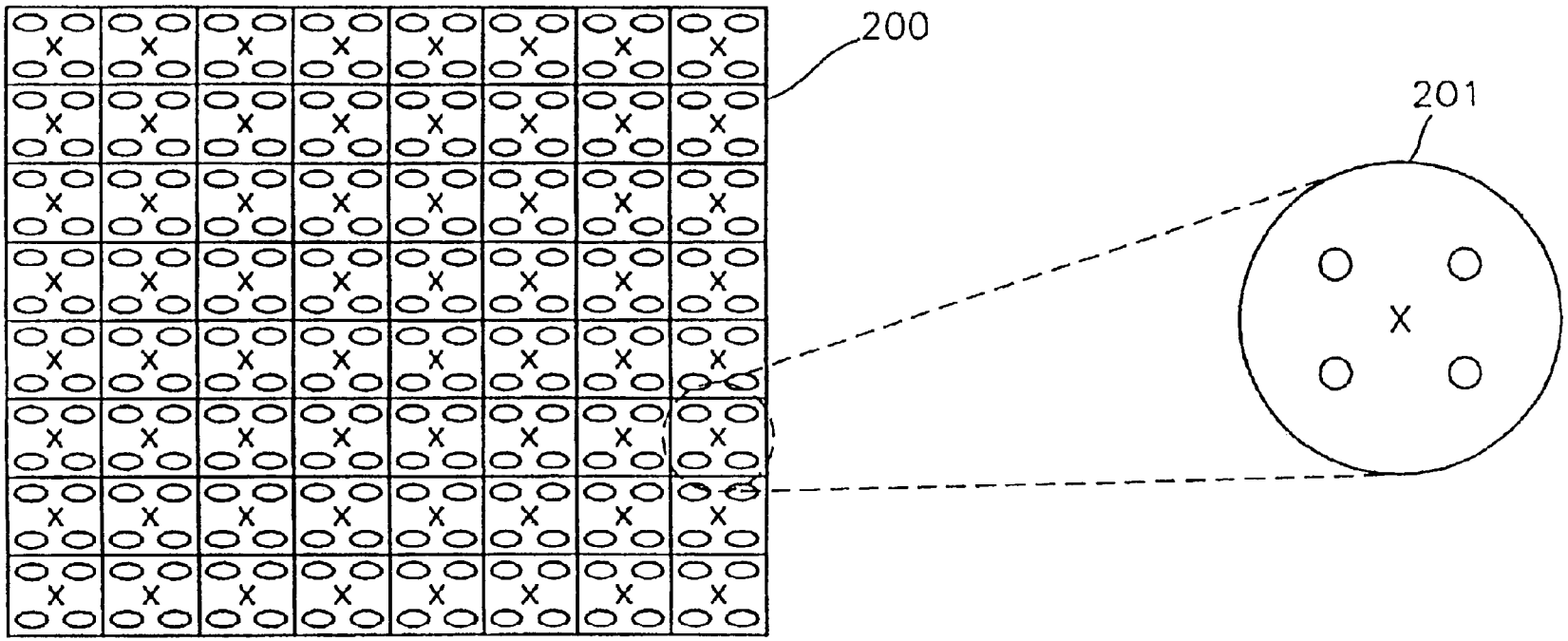
FIG. 1B is a diagram illustrating a down sampling step shown in FIG. 1A.

FIG. 1B illustrates in detail the down sampling step 100 shown in FIG. 1A. The binary image 200 is made into a plurality of macro blocks, as shown in FIG. 1B. Pixels indicated by a character "0" in a macro block 201 are converted into one pixel indicated by a character "X". Here, the size of the macro block is determined depending on the conversion ratio. The conversion ratio of MPEG-4 may be 1, ½ or ¼. Such conversion is performed on all macro blocks, resulting in an image reduced by the conversion ratio. In FIG. 1B, four pixels (indicated by "0") of a macro block are reduced to a pixel, that is, the convention ratio is equal to ½.

In the down sampling step, if half or more pixels of each group of four pixels in a macro block are equal to "1", the pixel value of the converted pixel becomes "1". Here, pixels having value "1" represent a part of the picture containing an object, and pixels having value "0" represent a part of the picture without an object. The boundary between pixels having value "1" and pixels having value "0" represents the boundary of the object information.

Figure 1C:
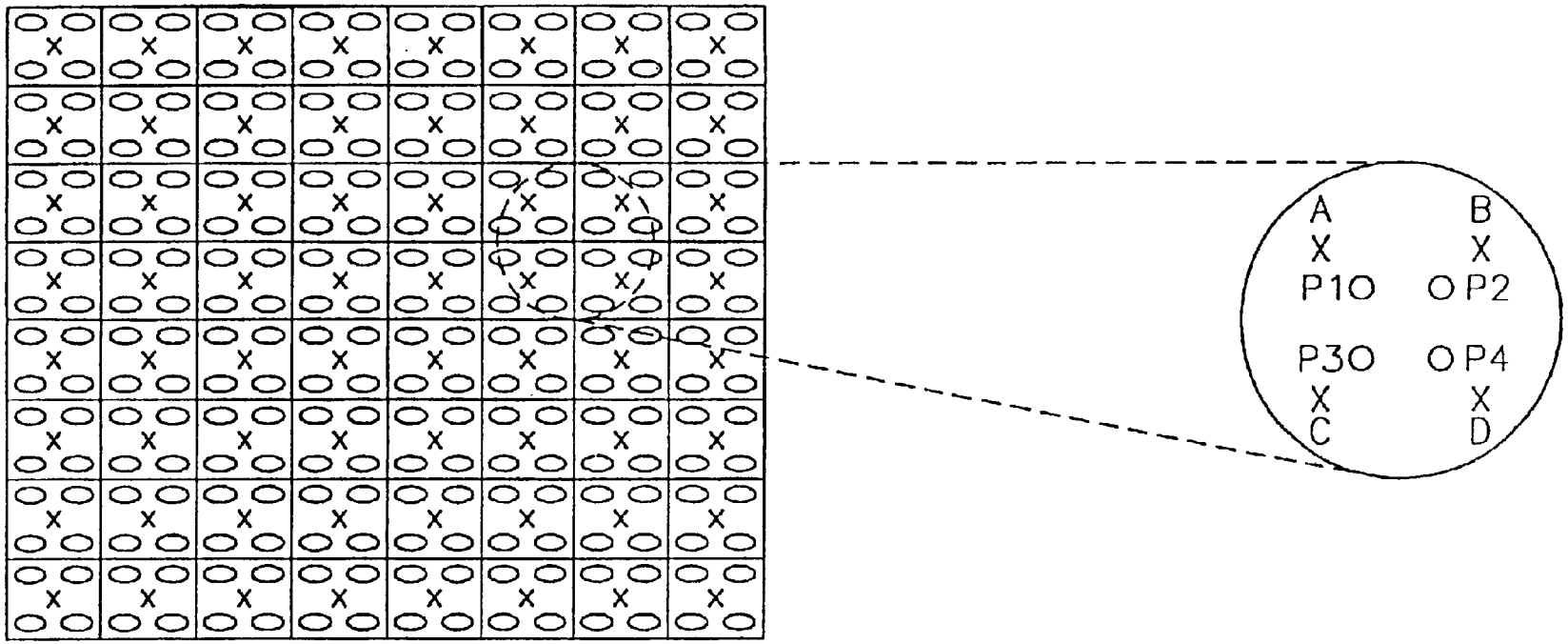
FIG. 1C is a diagram illustrating an up sampling step shown in FIG. 1A.
Figure 2A:
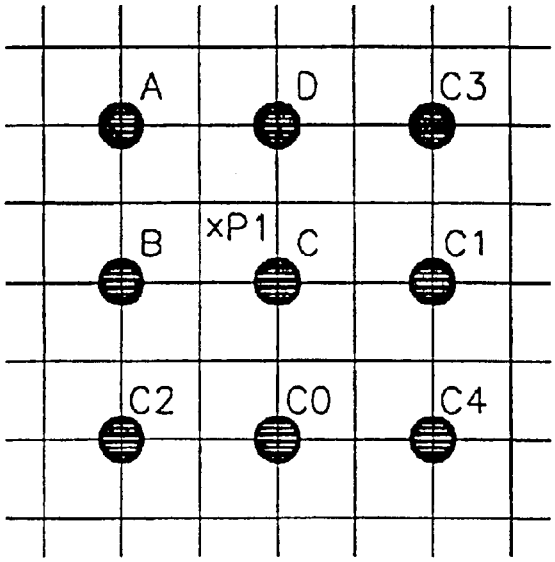
FIGS. 2A through 2D are diagrams illustrating an interpolation method according to the present invention.
Figure 2B:
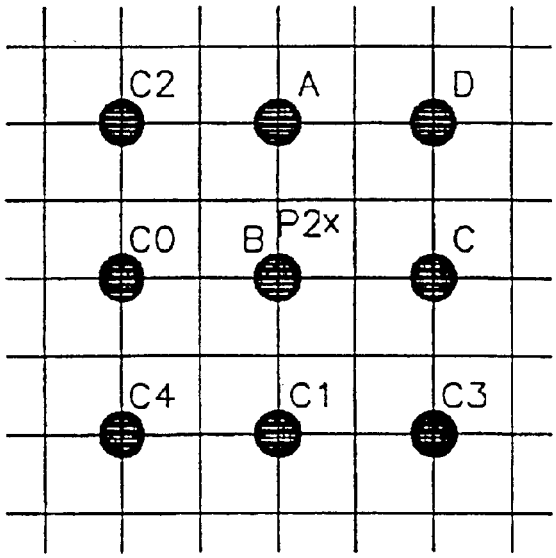
Figure 2C:
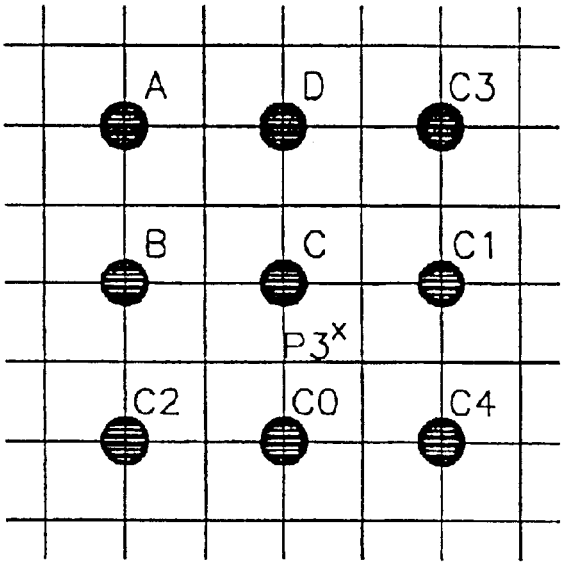
Figure 2D:
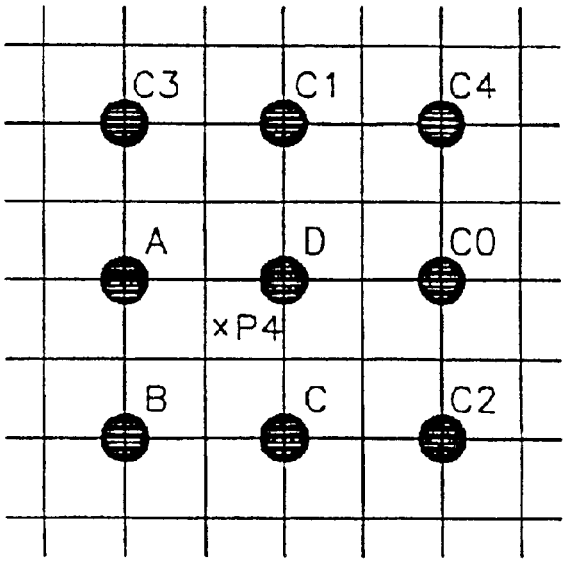

FIG. 1C illustrates in detail the up sampling step 106 shown in FIG. 1A. During the up sampling step, each pixel of the original binary image is restored by the interpolation using four pixels of the reduced image.

Referring to FIG. 1C, a conventional interpolation method will be described in detail.

In FIG. 1C, pixels A, B, C and D represent object pixels, which are pixels concerned in the interpolation, and pixels P1, P2, P3 and P4 represent interpolated pixels, which are pixels to be obtained by the interpolation. Here, the object pixels A, B, C and D surround the interpolated pixels P1, P2, P3 and P4. Also, the object pixels belong to the reduced image while the interpolated pixels belong to the restored binary image.

First, an interpolation value INP[P] is obtained by a linear interpolation method as follows, using the object pixels A, B, C and D:

$$INP[P1]=r*A+s*(B+C+D)$$

$$INP[P2]=r*B+s*(A+C+D)$$

$$INP[P3]=r*C+s*(A+B+D)$$

$$INP[P4]=r*D+s*(A+B+C)$$

where r and s are weights, and r is greater than s. That is, for each interpolated pixel, the larger weight is applied to the pixel which is the closest to each interpolated pixel.

Next, the obtained interpolation value INP[P] and a threshold value THR are compared. Here, the threshold value THR is set to a value which is half of the largest possible interpolation value. If the interpolation value INP [P] is greater than the threshold value THR, the pixel value of that interpolated pixel becomes "1". Otherwise, the pixel value of the interpolated pixel becomes "0". The pixel values are assigned arbitrarily and by convention. Naturally, they can be switched.

Here, only one threshold THR is applied while a plurality of interpolation values INP may be applied. Thus, if the interpolation value INP[P] and the threshold value THR are close to each other, it is unclear whether the pixel value of the interpolated pixel is correct or not. Accordingly, serious blocking or smoothing phenomenon is present in the restored binary image.

To reduce the blocking or smoothing, a threshold value to be compared with the interpolation value INP[P] is adaptively determined according to the context (state values of the pixels (reference pixels) around the interpolated pixel), thereby reducing ambiguity in determination of the pixel value of the interpolated pixel. Also, proposed threshold values are determined using a learning method.

An improved interpolation method according to the present invention will be described with reference to FIGS. 2A through 2D. In FIGS. 2A through 2D, pixels A, B, C, D, C0, C1, C2, C3 and C4 indicated by "0" are pixels of the reduced image, and pixels P1, P2, P3 and P4 indicated by "X" represent the interpolated pixels of the restored binary image.

First, the interpolation value of a pixel to be generated by interpolation is calculated. Here, the interpolation value is calculated by a bilinear interpolation method. However, the interpolation value may alternatively be calculated by using the average of the object pixels or other methods.

The interpolation value is calculated using the bilinear interpolation method by the following equation (1):

$$INP[P]=A\cdot(1-h)(1-v)+B\cdot(1-h)v+C\cdot h(1-v)+\cdot hv \quad (1)$$

where h and v of each term represent horizontal and vertical distances between the object pixel and the interpolated pixel included in the corresponding term. The interpolation value INP[P] is determined as a value between 0 and 1.

The number of combinations of the object pixels is equal to 16, and the number of interpolation values INP[P] is 16. However, if duplicate values are not counted, the actual number of interpolation values is 12, which are all between 0 and 1. Accordingly, an integer t has the range of ~11, and the number of proposed threshold values THRc[t] is equal to 12, including 0, 0.0625, 0.1875, 0.25, 0.375, 0.4375, 0.5625, 0.625, 0.75, 0.8125, 0.9375 and 1.

Then, the context (state value of the reference pixels) is calculated by the following equation (2):

$$C_P = \sum_{0}^{k} C_k \cdot 2^k \quad (2)$$

where P represents the position of the interpolated pixel (P indicates P1 in FIG. 2A, P2 in FIG. 2B, P3 in FIG. 2C or P4 in FIG. 2D), $C_k$ represents the reference pixel (C0, C1, C2, C3 and C4 for K=0, 1, 2, 3 and 4, respectively), and k is an index of reference pixels. Here, the index k is varied depending on the position of the interpolated pixel. In the present invention, five pixels around the object pixels are used as the reference pixels.

FIGS. 2A through 2D show positions and indices of the reference pixels used for interpolating the interpolated pixels P1 through P4, respectively.

The proposed threshold values THRc[t] are determined by a learning method, described below.

Then, the interpolation value INP[P] and the threshold value THRc based on the context are compared to determine the pixel value of the interpolated pixel.

If the interpolation value INP[P] is greater than the threshold value THRc, the pixel value of the interpolated pixel becomes "1". Otherwise, the pixel value of the interpolated pixel becomes "0".

Next, a method for determining the threshold value THRc based on the context of the reference pixel will be described. The threshold value THRc is obtained by a learning method. The learning is performed by the step of comparing the original binary image with the restored binary image.

Figure 3:
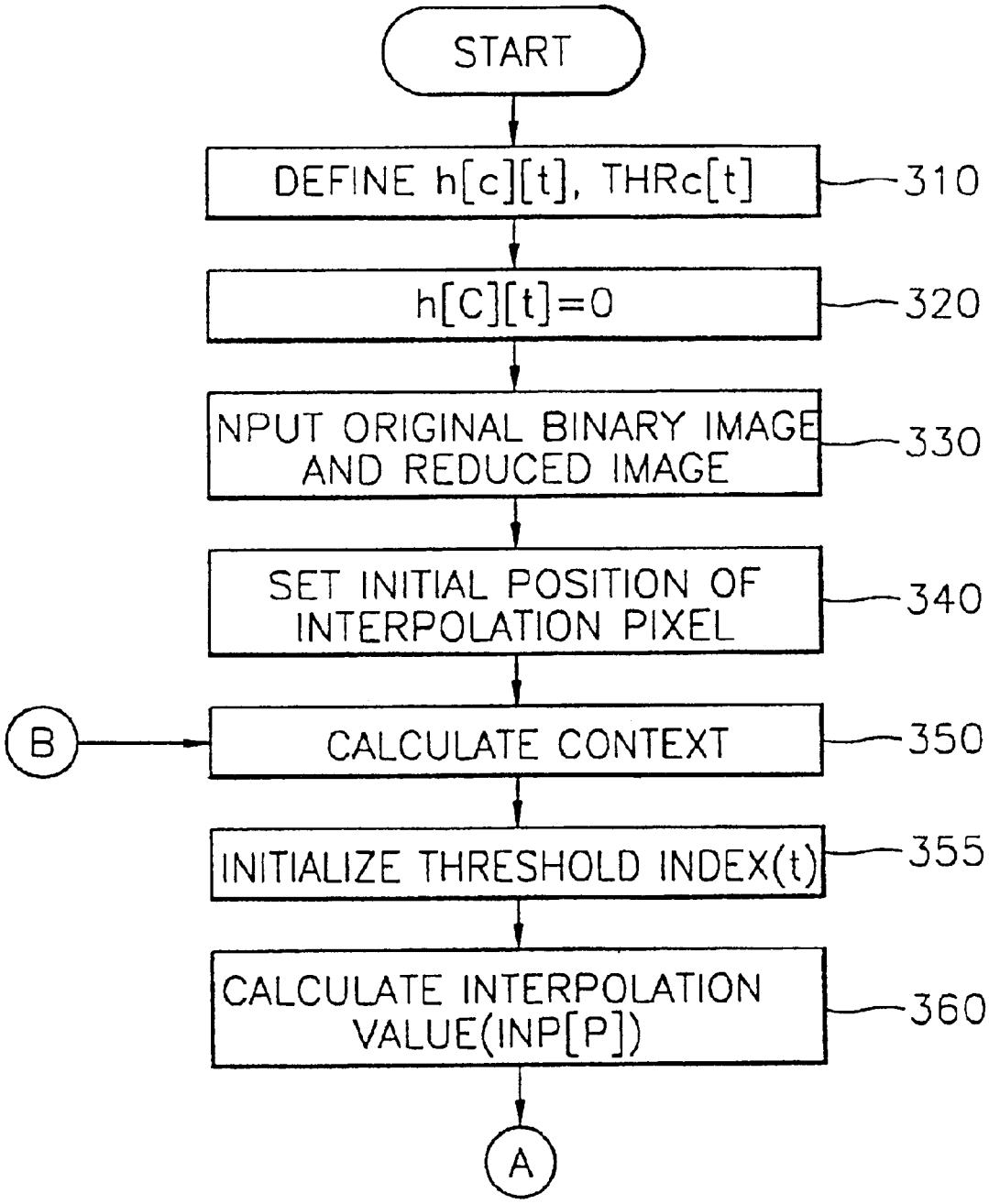
[FIG. 3]*FIGS. 3 and 3A in combination* is a flowchart illustrating a threshold value learning method according to the present invention.

In detail, referring to FIG. 3, first, arrays h[c][t] and THRc[t] are defined (step 310).

Here, the array h[c][t] holds numbers of hits, where a hit is the name given to when the restored pixel value is equal to the original pixel value. The hits are determined by applying all of the possible threshold values to each context. Here, c is an index of the interpolation values, and t is an index of the proposed threshold values. In the case of FIG. 2, since the number of interpolation values and the number of proposed threshold values are both equal to 12, the size of the array becomes h[11][11].

Also, the array THRc[t] stores the proposed threshold values. Here, t is an index of the proposed threshold values.

Then, the array h[c][t] is initialized to zero (step 320).

After initializing the array h[c][t] to zero, the original binary image and the reduced image are input (step 330).

Then, the location of an initial interpolated pixel is determined. The interpolation is performed from the upper-left to the lower-right by a raster scanning (step 340).

Once the location of the interpolated pixel is determined, context is calculated by the above equation (2) (step 350).

The threshold index t is initialized (step 355).

Then, the interpolation value INP[P] of the interpolated pixel is calculated (step 360).

Figure 3A:
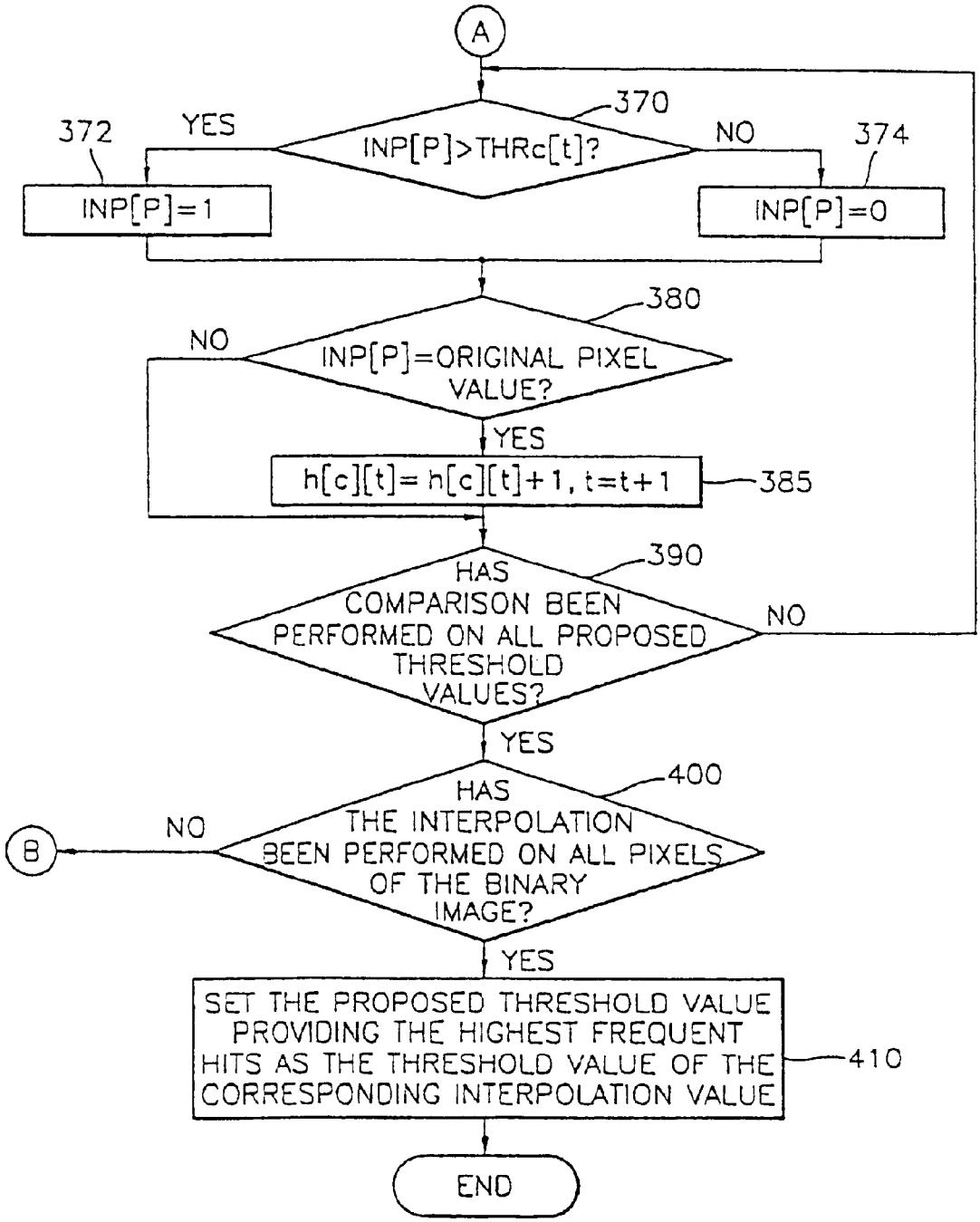

The current proposed threshold value from THRc[t] is compared with the calculated interpolation value INP[p] (step 370, *FIG. 3A*). If the interpolation value INP[p] is greater than the proposed threshold value THRc[t], the pixel value P of the interpolated pixel is set to "1" (step 372). Otherwise, the pixel value P of the interpolated pixel is set to "0" (step 374).

The pixel value P of the interpolated pixel is compared with the original pixel value (step 380). If the pixel value P is equal to the original pixel value, the corresponding value in the array h[c][t] is increased by "1". This value represents the number of hits (step 385). Otherwise, the step 385 is not performed.

It is checked whether the comparison of step 380 has been performed on all proposed threshold values of the current interpolation value (step 390).

If the condition of step 390 is satisfied, it is determined whether the interpolation has been performed on all pixels of the binary image (step 400).

If the condition of step 390 is not satisfied, then the process returns to step 370.

If the interpolation has been performed on all pixels of the binary image, the proposed threshold value providing the highest frequency of hits is set as the threshold value of the corresponding interpolation value (step 400).

If the condition of step 390 is not satisfied, the process returns to step 350.

According to the interpolation method of the present invention, ambiguity of the restoration performed by using only the interpolation value obtained by the bilinear interpolation can be removed by using the context, thereby reducing restoration error in the restored binary image.

The invention may be embodied in a general purpose digital computer that is running a program or program segments originating from a computer readable or usable medium, such medium including but not limited to magnetic storage media ((e.g., ROM's, floppy disks, hard disks, etc.), optically readable media (e.g., CD-ROMs, DVDs, etc.) and carrier waves (e.g., transmissions over the Internet). A functional program, code and code segments, used to implement the present invention can be derived by a skilled computer programmer from the description of the invention contained herein.

Figure 4A:
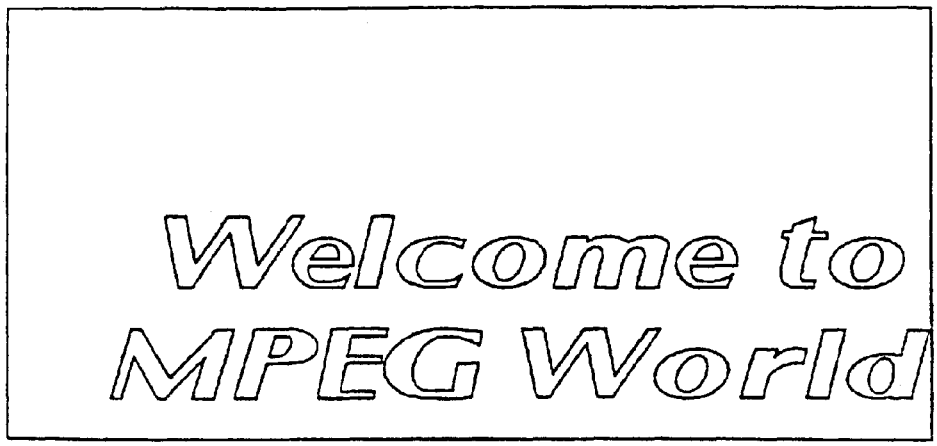
FIGS. 4A through 4C show the effect of the interpolation method according to the present invention, in contrast to the conventional method.
Figure 4B:
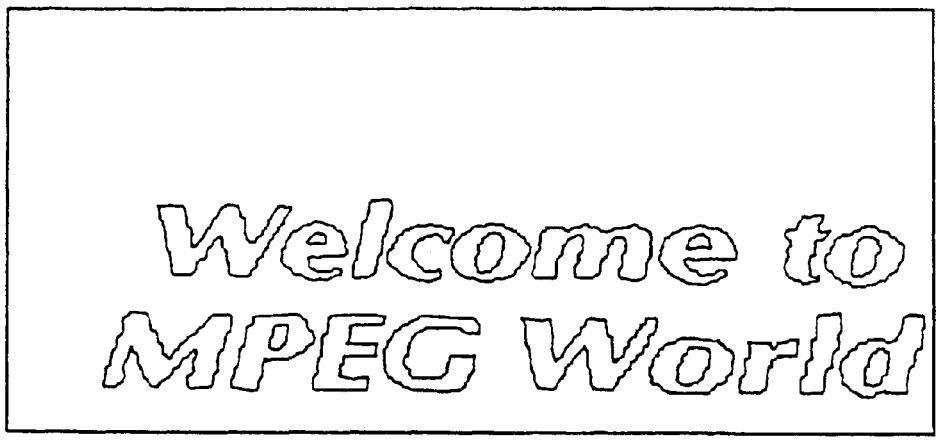
FIG. 4B(PRIOR ART)
Figure 4C:
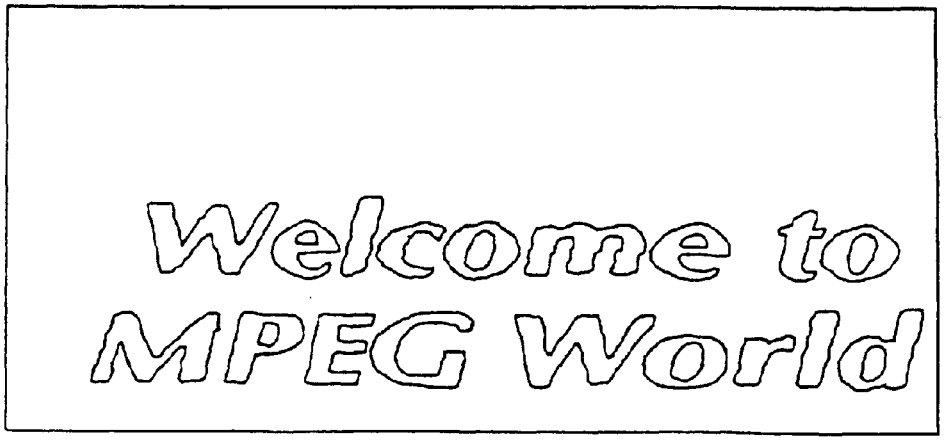

FIGS. 4A through 4C show the effect of the interpolation method according to the present invention, in contrast to the conventional method. In detail, FIG. 4A shows the original binary image containing the MPEG-4 logo, FIG. 4B shows the result of the conventional interpolation described with reference to FIG. 1C, and FIG. 4C shows the result of the interpolation according to the present invention. As can be seen from FIGS. 4B and 4C, the blocking and smoothing effects are sharply reduced compared to the conventional method.

As described above, in the interpolation method of the present invention, the ambiguity in the comparison between the interpolation value and the threshold value is removed by using the context (state value of the reference pixels around the interpolated pixel), thereby reducing the blocking and smoothing phenomena in the restored binary image.

What is claimed is:

1. A computer usable medium having embodied thereon a computer program for restoring a reduced binary image, reduced from an original binary image by down sampling, into the original binary image, comprising the steps of:

(a) calculating a predicted value of an interpolated pixel based on values of object pixels A, B, C and D around the interpolated pixel using the following equation:

$$INP(P)=A\cdot(1-h)(1-v)+B\cdot(1-h)v+C\cdot h(1-v)+D\cdot hv,$$

where h and v of each term represent horizontal and vertical distances between the object pixel and the interpolated pixel included in the corresponding term;

(b) calculating a context $C_P$, representing a state value of reference pixels around the object pixels, by concatenation of the reference pixel values using the following equation:

$$C_P = \sum_{0}^{k} C_k \cdot 2^k$$

wherein P represents the position of the interpolated pixel, $C_k$ represents the reference pixel and k is an index of reference pixels;

(c) obtaining a threshold value, THRc(t), corresponding to the context $C_P$ which is changed in each interpolated pixel based on its context; and (d) determining the interpolated pixel as "1" if the predicted value in step (a) is greater than the threshold value in step (c), and setting the pixel value of the interpolated pixel as "0" otherwise.

2. The computer usable medium of claim 1, wherein the predicted value in step (a) is calculated by summing the values of the neighboring pixels which are weighted in a way that the nearer pixel to an interpolated pixel, the larger its weight value.

3. The computer readable medium of claim 1, wherein the threshold value THRc(t) in said step (c) is obtained using the context value to decide whether each interpolated value is a "1" or "0" is determined using one of some predefined values comprising 12 default values which are calculated from the equation use in step (a).

4. The computer readable medium of claim 3, wherein said default values include: 0, 0.0625, 0.1875, 0.25, 0.375, 0.4375, 0.5625, 0.625, 0.75 and 0.9375.

5. The computer usable medium of claim 1, wherein the proposed threshold set of threshold values cited by context values in step (c) are obtained by the steps of:

(c1) defining arrays h(c)(t) and THRc(t), where c is an index of the predicted values in step (a), and t is an index of proposed threshold values;

(c2) initializing the array h(c)(t) to zero, and receiving the original binary image and the reduced image;

(c3) determining the location of the interpolated pixel to be interpolated, according to a raster scanning, and calculating a context of the reference pixels;

(c4) initializing the threshold index t of proposed threshold values;

(c5) calculating interpolation value INP(P) of the interpolated pixel as in step (a);

(c6) comparing the current proposed threshold value THRc(t) with the calculated predicted value INP(P), and setting the pixel value of the interpolated pixel to "1" if the interpolation value INP(P) is greater than the proposed threshold value THRc(t), and setting the pixel value of the interpolated pixel to "0" if the interpolation value INP(P) is less than or equal to the proposed threshold value THRc(t);

(c7) comparing the pixel value of the interpolated pixel with the original pixel value, and increasing the value of the array h(c)(t) and the index of proposed threshold values t by "1" if there is a hit, where a hit occurs when the pixel value of the interpolated pixel is equal to the original pixel value;

(c8) checking whether the comparison of the step (c6) has been performed on all proposed threshold values, and returning to the step (c6) if the comparison has not been performed on all candidate values;

(c9) checking whether the interpolation has been performed on all pixels of the binary image, and returning to the step (c3) if the interpolation has not been performed on all pixels of the binary image; and (c10) setting the proposed threshold value having the highest frequency of hits as the threshold value of the corresponding interpolation value, if the interpolation is performed on all pixels of the binary image.

*6. A computer usable medium having embodied thereon a computer program for restoring a reduced binary image, reduced from an original binary image by down sampling, into the original binary image, comprising the steps of:*

*(a) calculating a predicted value of an interpolated pixel based on values of object pixels A, B, C and D around the interpolated pixel;*

*(b) calculating a context $C_{p1}$, representing a state value of reference pixels around the object pixels, by concatenation of the reference pixel values using the following equation:*

$$C_p = \sum_{0}^{k} Ck \cdot 2^k$$

*wherein p represents the position of the interpolated pixel Ck represents the reference pixel and k is an index of reference pixels;*

*(c) obtaining a threshold value, THRc(t), corresponding to the context $C_P$ which is changed in each interpolated pixel based on its context; and*

*(d) comparing the predicted value with the threshold value of step (c), and determining the interpolated pixel as "1" if the predicted value in step (a) is greater than the threshold value in step (c), and setting the pixel value of the interpolated pixel as "0" if the predicted value is equal to or less than the threshold value.*

*7. The computer usable medium of claim 6, wherein the predicted value in step (a) is calculated by summing the values of the neighboring pixels which are weighted in a way that the nearer pixel to an interpolated pixel, the larger its weight value.*

*8. The computer readable medium of claim 6, wherein the threshold value THRc(t) in said step (c) is obtained using the context value to decide whether each interpolated value is a "1" or "0" is determined using one of some predefined values comprising 12 default values which are calculated from the equation use in step (a).*

*9. The computer readable medium of claim 8, wherein said default values include: 0, 0.0625, 0.1875, 0.25, 0.375, 0.4375, 0.5625, 0.625, 0.75 and 0.9375.*

*10. The computer usable medium of claim 6, wherein the proposed threshold set of threshold values cited by context values in step (c) are obtained by the steps of:*

*(c1) defining arrays h(c)(t) and THRc(t), where c is an index of the predicted values in step (a), and t is an index of proposed threshold values;*

*(c2) initializing the array h(c)(t) to zero, and receiving the original binary image and the reduced image;*

*(c3) determining the location of the interpolated pixel to be interpolated, according to a raster scanning, and calculating a context of the reference pixels;*

*(c4) initializing the threshold index t of proposed threshold values;*

*(c5) calculating interpolation value INP(P) of the interpolated pixel as in step (a);*

*(c6) comparing the current proposed threshold value THRc(t) with the calculated predicted value INP(P), and setting the pixel value of the interpolated pixel to "1" if the interpolation value INP(P) is greater than the proposed threshold value THRc(t), and setting the pixel value of the interpolated pixel to "0" if the interpolation value INP(P) is less than or equal to the proposed threshold value THRc(t);*

*(c7) comparing the pixel value of the interpolated pixel with the original pixel value, and increasing the value of the array h(c)(t) and the index of proposed threshold values t by "1" if there is a hit, where a hit occurs when the pixel value of the interpolated pixel is equal to the original pixel value;*

*(c8) checking whether the comparison of the step (c6) has been performed on all proposed threshold values, and returning to the step (c6) if the comparison has not been performed on all candidate values;*

*(c9) checking whether the interpolation has been performed on all pixels of the binary image, and returning*

*to the step (c3) if the interpolation has not been performed on all pixels of the binary image; and*

*(c10) setting the proposed threshold value having the highest frequency of hits as the threshold value of the corresponding interpolation value, if the interpolation is performed on all pixels of the binary image.*

* * * * *